Patented June 9, 1925.

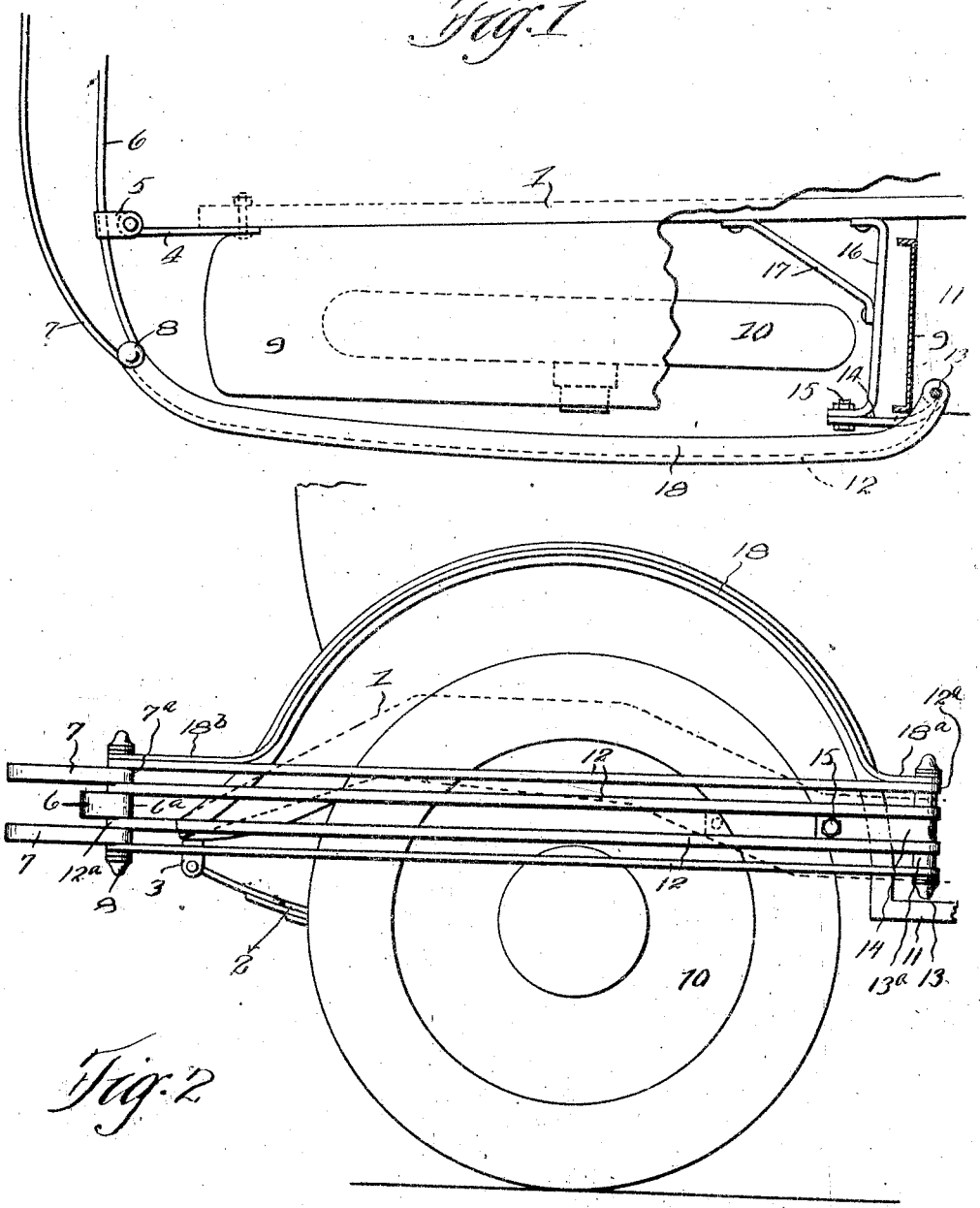

1,541,041

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

FENDER GUARD.

Application filed August 9, 1923. Serial No. 656,619.

*To all whom it may concern:*

Be it known that I, CHRISTIAN GIRL, a citizen of the United States, residing at Kalamazoo, in the county of Kalamazoo and State of Michigan, have invented a certain new and useful Improvement in Fender Guards, of which the following is a full, clear, and exact description, reference being had to the accompanying drawings.

This invention relates to guards for the fenders of automobiles and similar vehicles, and has for its general object to provide a guard for this purpose which is simple in construction but which is extremely efficient in operation; also to provide novel means for mounting such guard in operative relation to a fender. I accomplish the foregoing general objects in and through the construction and arrangement of parts shown in the drawing forming part hereof, wherein Fig. 1 represents a plan view, with certain parts broken away, of the rear end of one side of an automobile having my invention applied thereto; and Fig. 2 represents a side elevation of the parts shown in Fig. 1.

Describing by reference characters the various parts illustrated in the drawings, 1 denotes one of the side sills or members of an automobile, the part of such member shown therein being the rear part and being bent upwardly and then downwardly to accommodate the rear axle and the spring-suspension. 2 denotes the rear spring, suspended from the rear end of the frame member by the usual shackles 3. Secured to the rear end of the side member 1 is an arm 4 having an eye at its rear end to which a clamp 5 is pivoted, the said clamp being secured to the forwardly positioned bar 6 of a rear bumper having two impact bars 7 parallel with each other and positioned one above and the other below the bar 6. The ends of the bars 6 and 7 are provided with the eyes 6ª and 7ª (see Fig. 2) and are connected by means of a bolt 8 at each end of the bumper extending through the aligned eyes.

The bumper just described is preferably of a type shown, described, and claimed in the patent to A. L. McGregor, 1,372,154, March 22, 1921.

9 denotes generally the rear fender and 10 the rear wheel. The front end of the fender is supported in the usual manner from the running board 11 and its rear end is protected against injury from the rear by means of the bumper just described. While the rear bumper which has been described herein is not necessary for the purpose of supporting my fender guard, the bolt 8, at each end of such rear bumper, provides a convenient means for supporting the adjacent or rear end of such fender guard, it being noted that, in the case of a front fender guard, its front end may be supported from the adjacent end of a front bumper, particularly one having bolts at the ends thereof, as is the case with the rear bumper, just described.

I have also shown herein a side bumper as set forth in my application No. 652,523, filed July 19, 1923, for the reason that, while it is not a necessary adjunct of my guard, it affords, when present, a most convenient means for supporting the opposite ends of the same. Briefly described, the side bumper consists of a plurality of parallel, vertically spaced bars 12 each having an eye 12ª at each end thereof. The rear ends of the bars 12 are shown as supported by the adjacent bolt 8 of the rear bumper, the said bars being interspaced with the bars 6 and 7. The front ends of the bars 12 are supported in like manner by a bolt 13 (similar to the bolt 8) the said bolt extending through a central supporting arm 14, which is removably connected by a bolt 15 with a suitable arm 16 which is secured to the side member 1, the arm 16 being braced by a strut 17. The front ends of the bars 12 are maintained in proper relation by means of the eye on the front end of the plate 14 and by spacing washers 13ª on the bolt 13.

The bolts 8 and 13, where present with rear and side bumpers such as described, form a very convenient means for supporting my fender guard, which guard consists generally of a bar 18 located alongside of the adjacent lateral edge of the fender 9, the bar conforming in curvature to the curvature of such edge, except at its extreme front and rear ends, where it is bent horizontally, as shown at 18ª and 18ᵇ, these horizontal portions forming extended supports for the arched intermediate portion of the guard. The ends 18ª and 18ᵇ are provided each with an eye, which eyes are adapted to receive the bolts 13 and 8 respectively. Furthermore, where a side bumper is employed, the bar 18 will be given substantially the same outward curvature or camber as is given to the bar or bars thereof, as will be evident from Fig. 1, and the horizontally extended end portions 18ª and 18ᵇ can rest upon the end portions of the subjacent side bumper bar.

I preferably form the bar 18 in the shape shown; that is to say with a horizontal dimension greatly in excess of its vertical dimension, thereby imparting great resistance to the bar against blows delivered against the exposed lateral edge thereof, this resistance being increased by the outward convexity of the bar. It will be understood, however, that I do not limit myself to the particular shape of bar shown herein, except as such limitation may be set forth in any of the claims appended hereto.

A guard such as disclosed herein is extremely simple of construction, and is capable of being attached to and removed from the vehicle in a convenient manner, it being necessary only to add a supporting rear arm and an arm such as the arm 14 in the event that no side bumper is employed. Where such bumper is employed, a very convenient manner of mounting the guard is provided, as explained hereinbefore.

Having thus described my invention, what I claim is:—

1. The combination, with a fender of a vehicle, of a guard for said fender spaced from the lateral edge of the fender and conforming in curvature thereto, and means for supporting said guard.

2. The combination, with a side frame and fender of a vehicle, of a guard for said fender having an intermediate portion spaced from the lateral edge of the fender and conforming in curvature thereto, and means carried by said frame for supporting said guard therefrom.

3. The combination with a fender of an automobile, of a guard for such fender, the said guard comprising a bar of greater horizontal than vertical thickness, the said bar being curved to conform to the curvature of the fender, and means for supporting the said bar adjacent to and spaced from the outer lateral edge of the fender.

4. The combination, with a fender for an automobile, of a side bumper extending across the said fender, and a fender guard having an intermediate portion conforming in configuration with the lateral edge of the fender and having its ends supported from the said side bumper.

5. The combination, with an automobile fender, of a side bumper having a bar extending across the fender below the top thereof, a fender guard having an intermediate portion conforming in curvature to the curvature of the adjacent lateral edge of the fender and having flattened end portions adapted to rest upon the said bar, and means connecting the ends of said guard to said bumper.

In testimony whereof, I hereunto affix my signature.

CHRISTIAN GIRL.